(12) United States Patent
Deivasigamani et al.

(10) Patent No.: US 11,686,652 B2
(45) Date of Patent: Jun. 27, 2023

(54) FAILURE MODE DETERMINATION MEANS

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 0 days.

(21) Appl. No.: 17/735,393

(22) Filed: May 3, 2022

(65) Prior Publication Data
US 2022/0260460 A1 Aug. 18, 2022

Related U.S. Application Data (62) Division of application No. 16/720,253, filed on Dec. 19, 2019, now abandoned.

(60) Provisional application No. 62/785,100, filed on Dec. 26, 2018.

(51) Int. Cl.
*G01M 99/00* (2011.01)
*F04B 49/10* (2006.01)
*F04B 51/00* (2006.01)
*G05B 23/02* (2006.01)

(52) U.S. Cl.
CPC .......... *G01M 99/005* (2013.01); *F04B 49/10* (2013.01); *F04B 51/00* (2013.01); *G05B 23/0254* (2013.01)

(58) Field of Classification Search
CPC ........ G01M 99/005; F04B 49/10; F04B 51/00
See application file for complete search history.

(56) References Cited

U.S. PATENT DOCUMENTS

| | | | |
|---|---|---|---|
| 8,892,263 B1* | 11/2014 | Morris | G05D 7/0623 700/282 |
| 2011/0311370 A1* | 12/2011 | Sloss | F04B 49/065 417/1 |
| 2013/0336804 A1* | 12/2013 | Robinson | G05D 7/0617 417/22 |
| 2014/0199180 A1* | 7/2014 | Schoendorff | F04B 51/00 417/63 |
| 2016/0333884 A1* | 11/2016 | Hussain | F04D 15/0236 |
| 2017/0058886 A1* | 3/2017 | Cummings | F04D 13/14 |
| 2021/0233377 A1* | 7/2021 | Schou | E03F 5/22 |

* cited by examiner

*Primary Examiner* — Ricky Go
(74) *Attorney, Agent, or Firm* — Tracy Jong Law Firm; Tracy P. Jong; Cheng Ning Jong (57) ABSTRACT

A method for determining a failure mode of a comfort device, the method includes obtaining a first input during a first operation of the comfort device, wherein the first operation is a known normal operation; classifying the first input into a class including a series of attributes and storing the first input in a database of input classes; obtaining a second input during a second operation of the comfort device; and classifying the second input into a class including a series of attributes and comparing the class of the second input to the class of the first input in a first comparison, wherein if a match exists, comparing the series of attributes of the second input to the series of attributes of the first input in a second comparison, wherein if a discrepancy is detected, a warning is raised.

7 Claims, 8 Drawing Sheets

FAILURE MODE DETERMINATION MEANS

PRIORITY CLAIM AND RELATED APPLICATIONS

This divisional application claims the benefit of priority from non-provisional application U.S. Ser. No. 16/720,253 filed Dec. 19, 2019 and provisional application U.S. Ser. No. 62/785,100 filed Dec. 26, 2018. Each said application is incorporated by reference in its entirety.

BACKGROUND OF THE INVENTION

1. The Field of the Invention

The present invention relates to failure mode determination means. More specifically, the present invention is directed to failure mode determination means for equipment in a boiler or mechanical room.

2. Background Art

Traditional failure mode detections means require dedicated monitoring of specific components of equipment for accurate detection of failure modes. For instance, in order to identify a failure mode associated with the process of water heating of a water heater or the equipment associated with heating of a water heater, various components of the water heater must be monitored as the failure of any one of the components may contribute to the failure in water heating. Typical components found in a water or fluid heating system include one or more blowers, igniters, burners, pumps, heat exchangers and various flow valves, etc. The failure of just one of these components can cause the water heater to fail. For instance, if the burner of a water heater is not ignited, no heating can occur or if the blower of an inverted vertically-disposed burner fails to turn on, the flue gas generated in the burner will not traverse the allocated flue exhaust properly. Therefore, in order to accurately identify a failure mode in a traditional water heating system, various components must be monitored. For instance, in order to monitor the health of a blower, a speed sensor may be used to make sure that the blower runs at a particular speed or range of speeds suitable to produce a heated fluid at a particular flowrate. A similar strategy may be employed for the pump where its speed is monitored. For instance, a pump speed of zero may point to a dead pump. Flame establishment is typically sensed and confirmed with thermocouples disposed in areas where flames are expected to form. In a traditional failure mode detection setting, in addition to the failure of components being monitored, the monitoring devices or sensors themselves can fail. Therefore, it is not difficult to realize that a simple monitoring system can quickly become costly and difficult to implement as the points of failure are numerous and the labor and materials associated with the system can be cost prohibitive to procure and maintain. Further, it would have been difficult to monitor equipment of different makes by a single party as there lacks standards for monitoring equipment and reporting or communication devices to communicate sensor data that can be readily understood and utilized. Further, if equipment health is monitored and reported by original equipment manufacturers (OEM), monitoring of equipment at a locale or mechanical room may only be performed in a disparate manner requiring input from various OEMs. Further, mechanical rooms disposed at a level susceptible to flooding often are equipped with drainage pumps. It is imperative for the pumps to function properly to ensure that the mechanical rooms remain dry.

There arises a need for a system capable of determining failure modes without incurring large costs associated with the procurement and operation of additional and dedicated monitoring components. There arises a need for a system capable of determining failure modes of most if not all equipment of different OEMs that are disposed in one mechanical room without requiring the OEMs to report failure modes of their respective equipment to the stakeholder of the mechanical room.

SUMMARY OF THE INVENTION

In accordance with the present invention, there is provided a method for determining a failure mode of a comfort device disposed in an environment, the method includes:
(a) obtaining a first input of the environment during a first operation of the comfort device, wherein the first operation is a known normal operation;
(b) classifying the first input into a class including a series of attributes and storing the first input in a database of input classes;
(c) obtaining a second input of the environment during a second operation of the comfort device; and
(d) classifying the second input into a class including a series of attributes and comparing the class of the second input to the class of the first input in a first comparison, wherein if a match exists, comparing the series of attributes of the second input to the series of attributes of the first input in a second comparison, wherein if a discrepancy is detected, a warning is raised.

In one embodiment, the second comparison includes comparing an order of the series of attributes of the second input to an order of the series of attributes of the first input.

In one embodiment, the second comparison includes comparing a frequency of at least one attribute of the series of attributes of the second input to a frequency of at least one corresponding attribute of the series of attributes of the first input.

In one embodiment, the second comparison includes comparing the magnitude of an attribute of the series of attributes of the second input to the magnitude of an attribute of the series of attributes of the first input. In one embodiment, the second comparison includes comparing the duration between two successive attributes of the series of attributes of the second input to the duration between two successive attributes of the series of attributes of the first input.

In one embodiment, each of the class corresponding to the first input and the class corresponding to the second input includes an audio input. In one embodiment, each of the class corresponding to the first input and the class corresponding to the second input includes a non-audio input. In one embodiment, each of the series of attributes of the class of the first input and the series of attributes of the class of the second input includes the following attributes: blower turn-on, igniter sparking and flame establishment. In one embodiment, each of the series of attributes of the class of the first input and the series of attributes of the class of the second input includes the following attributes: fuel valve current and igniter sparking.

In accordance with the present invention, there is further provided a failure mode determination means adapted to detect failure modes of a comfort device, the failure mode determination means including at least one audio input device configured for receiving an audio input of the comfort device, the audio input of the comfort device is compared to a plurality of pre-determined failure modes retrieved from a failure mode database, wherein if a match is found, the failure mode of the comfort device is determined.

In one embodiment, the at least one audio input device includes a first audio input device configured to receive a first audio input and be pointed towards a first direction relative to the comfort device and a second audio input device configured to receive a second audio input and be pointed towards a second direction relative to the comfort device and if the match is found, a prominence of the audio input corresponding to the match is determined within each of the audio input devices such that a predicted source of the audio input corresponding to the match is determined to be the audio input device pointed at by the audio input device having the more prominent audio input of the first and second audio inputs.

In accordance with the present invention, there is further provided a method for controlling a drain pump in a control system having a controller operably connected to the drain pump and weather data having rain data, the method including using the controller for:

(a) determining a current frequency of overlap of a second event with respect to a first event, wherein the current frequency of overlap includes the number of occurrences of the second event within the first event and a period after the first event; and (b) determining the existence of a fault by comparing the current frequency of overlap to a threshold frequency of overlap, wherein if the current frequency of overlap is lower than the threshold frequency of overlap by a first gap, a pump-dead fault is raised and if the current frequency of overlap is higher than the threshold frequency of overlap by a second gap, a pump-stuck-on fault is raised.

In one embodiment, the drain pump is a sump pump. In one embodiment, if one of the pump-dead and the pump-stuck-on faults has been raised, an action is executed. In one embodiment, the action includes sending an alert to a stakeholder of the drain pump. In one embodiment, the first event includes a time span of a day in which rain of an intensity level occurs over the time span of a day. In one embodiment, the first event includes a time span of a day in which snow of an intensity level occurs over the time span of a day. In one embodiment, the second event includes an event in which the drain pump is activated and de-activated.

An object of the present invention is to provide an equipment failure mode determination means that is capable of detecting failure modes for an equipment that exhibit operations unique to the environment in which the equipment is disposed.

Another object of the present invention is to provide an equipment failure mode determination means that is capable of uncovering not-yet-known equipment failure modes.

Another object of the present invention is to provide an equipment failure mode determination means that is capable of detecting failure modes for an equipment that may exhibit operations that change over time, due to factors, e.g., ageing of the equipment, etc.

Another object of the present invention is to provide an equipment failure mode determination means that is not hardcoded and therefore is useful for detecting failure modes from operations that can change in order, frequency and/or duration over time.

Another object of the present invention is to provide an equipment failure mode determination means that can be improved upon or configured for new failure modes without requiring new hardware.

Another object of the present invention is to provide an equipment failure mode determination means that is contactless.

An object of the present invention is to provide an equipment failure mode determination means capable of pinpointing the general vicinity of the equipment to be investigated.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—audio input
4—event
6—event
8—event
10—delay
12—delay
14—water heater
16—blower
18—igniter
20—furnace
22—listener
24—controller
26—thermostat
28—router
30—internet
32—mobile device
34—mechanical room
36—controller
38—audio input device, e.g., microphone
40—sample collection step
42—event detection step
44—event analysis step
46—checking step to determine whether an event is already listed in a library
48—step in which a newly detected pattern or class is added to a library
50—step in which a newly detected pattern or class is compared to patterns or classes in a library
52—step in which an alert is sent to a stakeholder
54—sump pump
56—storm drain
58—sump tank
60—water level
62—check valve
64—discharge pipe
66—drain system
68—wall power supply
70—portable power source
72—sensor
74—controller
76—relay
78—router
80—internet
82—transceiver
84—series of attributes
86—unexpected series of attributes
88—low temperature indication attribute
90—comfort device
92—high water level
94—low water level

PARTICULAR ADVANTAGES OF THE INVENTION

The present invention is capable of detecting failure modes for an equipment that exhibits operations unique to the environment in which the equipment is disposed. A traditional detection means can be used for determining operations that are pre-planned. Any changes in the order of operations, frequency and duration of one or more of its attributes can threaten to derail the detection of the failure mode in a traditional detection means.

The present invention is capable of uncovering not-yet-known equipment failure modes. In a conventional failure mode determination scenario, failure modes are determined based on detection of one or more conditions, e.g., a low temperature condition as indicated by a temperature sensor in the absence of a flame in a combustion situation or a pump failure condition as indicated by a lower-than-expected pump speed. By observing the audio contents of an environment in which any equipment to be monitored operate, a not-yet-known condition of one or more equipment may be detected.

The present invention is capable of detecting failure modes for an equipment that may exhibit operations that change over time, due to factors, e.g., ageing of the equipment, etc. For instance, if the establishment of a flame has taken longer over time, this event is still considered an attribute of a detected series of attributes. However, if compared to prior series of attributes collected, this attribute may have taken significantly longer, therefore indicating a potential problem, e.g., a dirty igniter or an electrode that has been coated with soot during its service life and requires cleaning or replacement. If the duration for establishing a flame had been hardcoded, a significant deviation of this prior established duration can cause the flame establishment to not be detected. Compared to sensor-based systems, this audio-based system removes the need for new sensors and other related hardware for monitoring a condition.

In one embodiment, the present invention allows an equipment failure mode determination means that is contactless as only an audio input is required at a listener of the present monitoring system.

In one embodiment, the present invention is capable of guiding a service personnel in narrowing down the scope in identifying a failure mode by pinpointing the general vicinity of the equipment to be investigated.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower). The term "stakeholder" is used herein to mean a user, maintenance personnel, owner of an equipment and/or any personnel that has an interest in ensuring that the equipment functions properly for the purpose it is designed to serve.

Figure 1:
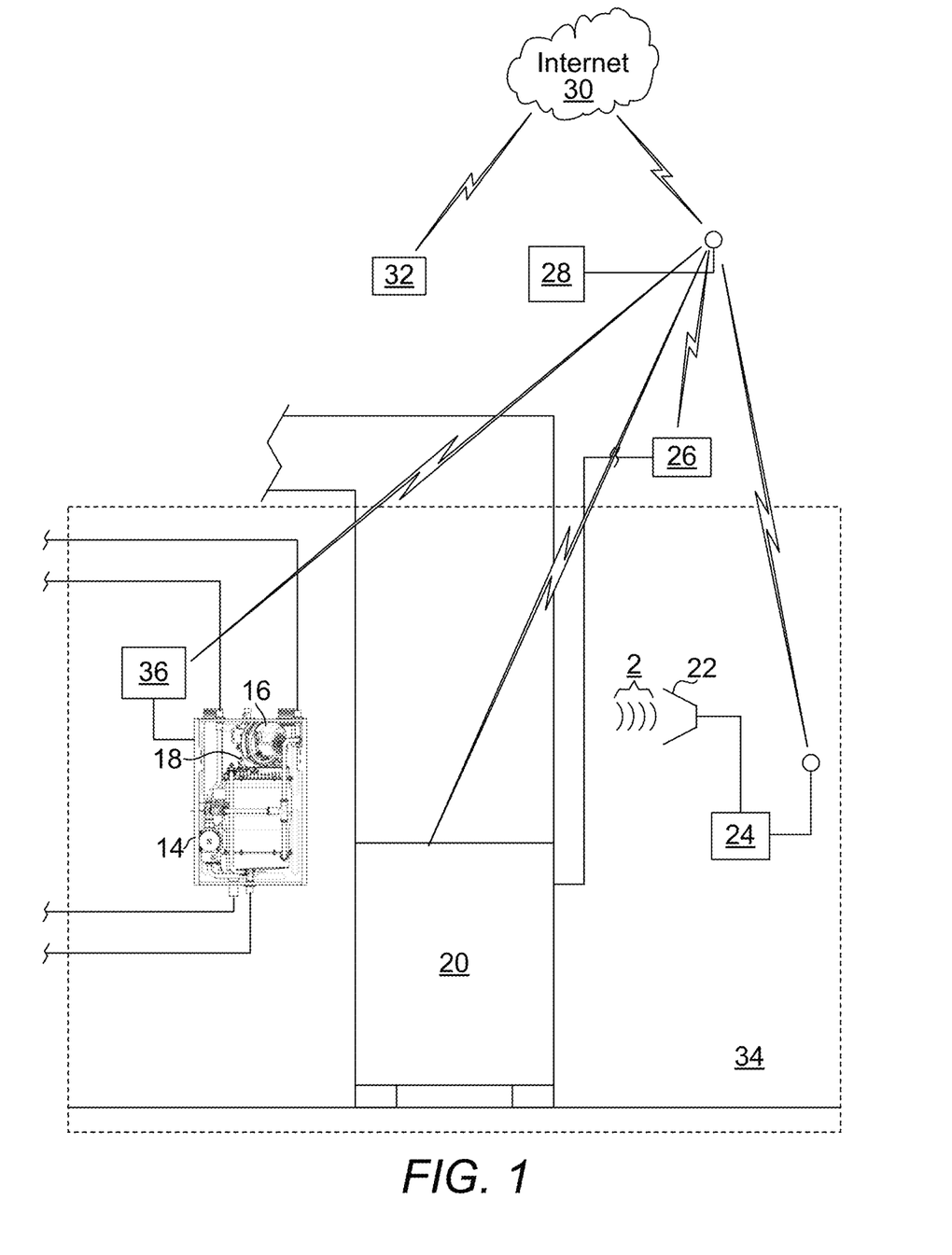
FIG. 1 is a diagram depicting an exemplary environment in which one embodiment of the present means can be used to detect failure modes of equipment.

FIG. 1 is a diagram depicting an exemplary environment in which one embodiment of the present means can be used to detect failure modes of equipment. The environment depicted is a mechanical room 34 in which a water heater 14 and a furnace 20 are disposed. Other comfort devices or commonly available devices, e.g., sump pumps, may be disposed in the mechanical room, away from habitable spaces of a building. A thermostat 26 is functionally connected the furnace and disposed at a location at which the ambient air temperature is controlled. The water heater 14 is shown with a burner having an igniter 18 and a blower 16 and a controller 36 for controlling the water heater 14 where the controller 36 is equipped with a communication device capable of communication via a communication protocol, e.g., Wireless Fidelity (Wi-Fi), Bluetooth, etc. A listener 22 is disposed in the same room 34 for receiving audio input 2. The listener 22 is functionally connected to a controller 24 which is also equipped with a communication device capable of communication via a communication protocol. Although listener 22 is shown connected to a dedicated controller 24, it may be instead functionally connected to another controller that is already used to control another equipment in the mechanical room 34, e.g., controller 36 in order to remove the need for a dedicated controller for listener 22. A router 28 is provided to serve as a means to connect locally disposed devices to the internet 30. A mobile device 32 is shown connected to the internet 30. Therefore, any one of the equipment in the mechanical room 34 is capable of communication with the internet 30 and any devices connected to the internet 30, e.g., the mobile device 32. In use, the listener 22 is configured for receiving an audio input 2 in the room 34. In the next figure, it will be shown a sample audio input 2 when only the water heater 14 is firing to meet a hot water demand.

Figure 2:
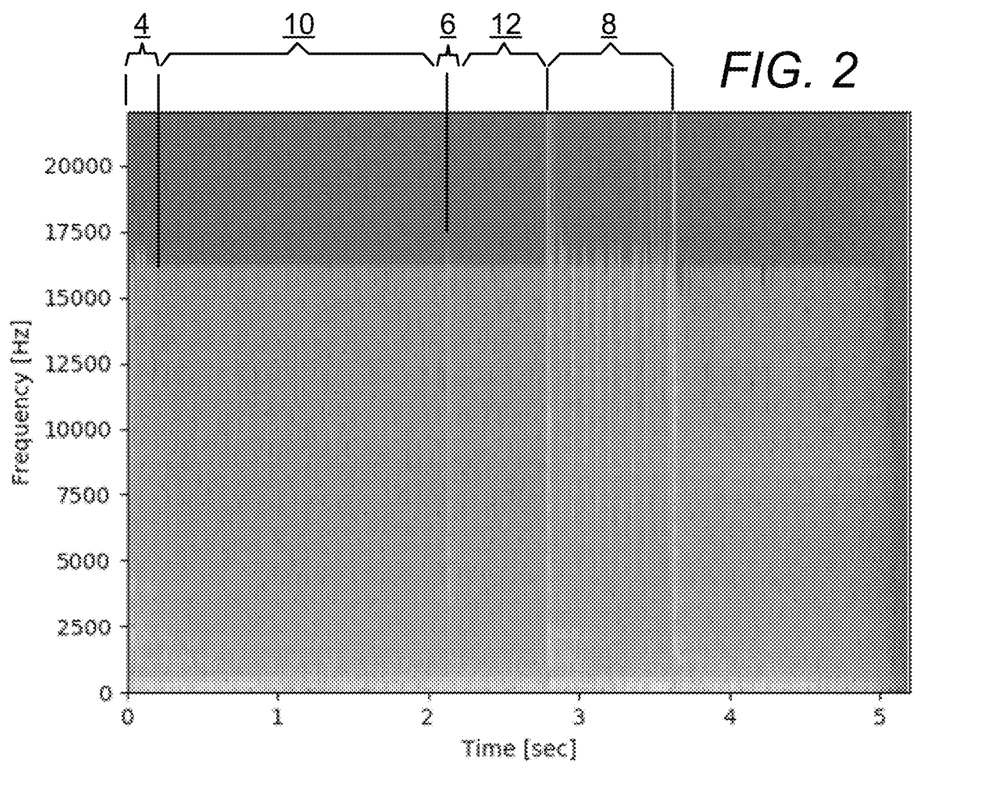
FIG. 2 is a spectrogram of an audio input of a boiler/mechanical room, depicting a series of attributes exhibited by the establishment of a flame.

FIG. 2 is a spectrogram of an audio input of a boiler/mechanical room, depicting a series of attributes exhibited by the establishment of a flame, e.g., in an environment shown in FIG. 1. Here, an audio input 2 is shown over time. In this example, the failure mode to be determined is flame failure. The "characteristics" or series of attributes for flame establishment is as follows: First, event 4 is detected where it corresponds to a turn-on event of a blower 16 of a burner. In one embodiment, a number of, e.g., up to, three attempts of lighting a fuel, e.g., a mixture of air and fuel, with a spark, is made to establish a flame. Each sparking event can be detected in an audio input as a particular frequency labelled as event 6 in FIG. 2. Here only one sparking event is needed before the burner is lit by only one sparking attempt. This is followed by a delay 10 before another event, i.e., event 8, is detected where this event corresponds to the establishment of a flame. It shall be noted that, in this event, although one sparking event 6 is detected, up to three such event is tolerated before a warning is communicated to a stakeholder of the equipment. In one embodiment, the overall operation of the lighting of the burner can be viewed as a series of attributes where it can be seen that the order of these attributes is critical in the successful lighting and maintenance of the flame, i.e., a blower that supplies the burner with an air flow which creates a flue flow of the burner must be first turned on before the burner is lit as the flue flow must travel in the right direction to exit an exhaust disposed at a downstream location of the burner. A machine learning system can be trained with audio input containing series of attributes such as this especially upon new installation of an equipment such that a baseline model for a failure mode can be established, i.e., when the equipment is functioning normally. In other words, the series of attributes can be classified as a particular system operation. The baseline model may also be updated with newly obtained data such that concurrent models that reflect the age and conditions of the equipment may be used instead of the baseline model obtained at the beginning of the service life of the equipment. Referring back to FIG. 1, it shall be noted that there is one mechanical room depicted. However, baseline models may be built based not only on an individual equipment at each location but also collectively multiple equipment across multiple locations. For instance, equipment of a particular model may be installed at many different locations. However, they may function similarly across all locations and their baseline models may be built much more expediently with collection of data from multiple equipment from multiple locations as compared to just one equipment from one location. As another example, a failure mode may also be detected if the furnace 20, which includes, e.g., a blower and a burner, fails to get turned on if a demand for warm air has been requested, e.g., if the setpoint temperature of the has been increased, e.g., via the thermostat 26 and that the furnace 20 has been determined to be required to bring the air temperature surrounding the thermostat 26 to the new desired setpoint. Again, the series of attributes that is required to turn on a furnace may mirror the series of attributes involved in the turn-on of the water heater, i.e., a blower of the furnace is turned on first before a sparking event is used to establish a flame.

Figure 3:
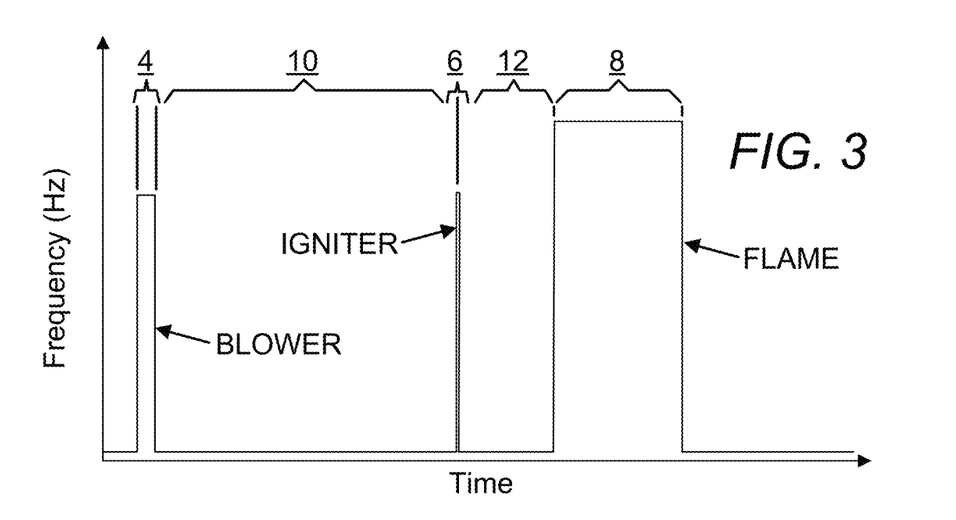
FIG. 3 is a simplified diagram representing a series of attributes exhibited by the establishment of a flame.
Figure 4:
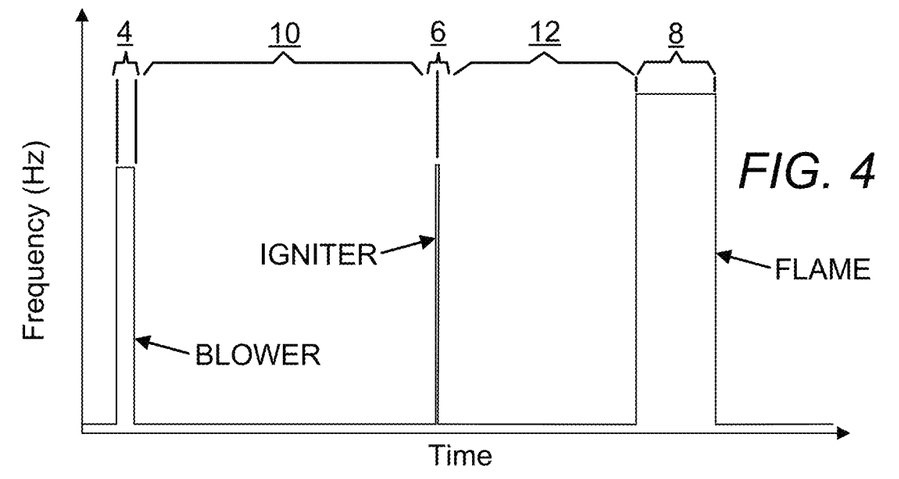
FIG. 4 is a simplified diagram representing a series of attributes exhibited by the establishment of a flame, depicting a delayed flame establishment event compared to the same event shown in FIG. 3.

FIG. 3 is a simplified diagram representing a series of attributes exhibited by the establishment of a flame. Over time, as new series of attributes matching this established series of attributes have been detected, they may be used as training data to further fine tune the already established baseline model if the new series of attributes do not contain parameters deviating significantly from the baseline model. However, a significant deviation of a parameter of the attribute as shown in FIG. 4 can cause the deviation to be detected as a failure mode. FIG. 4 is a simplified diagram representing a series of attributes exhibited by the establishment of a flame, depicting a delayed flame establishment event compared to the same event shown in FIG. 3. When compared to the baseline model, if a new delay of a new series of attributes falls within a certain pre-defined tolerance of the delay 12, then the new series of attributes is considered an acceptable flame establishment operation. However, if the new delay falls outside of the tolerance, a warning may be raised to alert the stakeholder of the equipment that an imminent problem may occur. Further, if the longer delay represents a failing electrode or ignition module, a message reflecting such a condition may be provided to the same stakeholder such that an early warning can be acted upon to prevent an inadvertent shutdown at a later time. If no event 4 is detected, then it can be said that the blower fails to turn-on.

Figure 5:
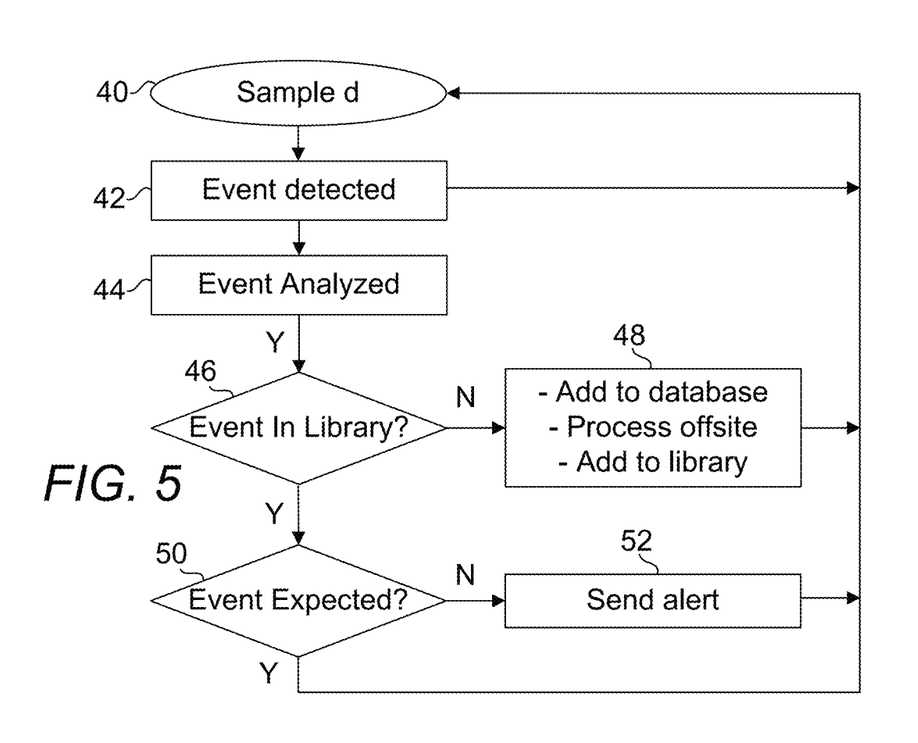
FIG. 5 is a flowchart depicting a series of steps useful for building a system for detecting a failure mode.

FIG. 5 is a flowchart depicting a series of steps useful for building a system for detecting a failure mode. An audio or non-audio input is collected as in step 40. During operation of the system, a series of attributes may be detected in the input as in step 42. The series of attributes is then analyzed as in step 44 to result in a particular pattern or class. The pattern is checked against the events or patterns previous stored in a library as in step 46. If the pattern is not available in the library, then the pattern is added as a new pattern to the library as in step 48. This way, the library is a growing list of patterns. This is especially important in capturing patterns that were not previously known which can become important at a later time. For instance, a failure mode that may never be detected in an equipment development facility may occur in a particular environment with particular environmental factors, e.g., temperature, pressure and/or moisture level, etc. The patterns stored in a library is not limited to multi-attribute series of attributes. A single attribute, i.e., of a particular frequency not detected before can also be added as a pattern in the library. For instance, if a bearing that is failing in a particularly dry mechanical room and generates a particularly high frequency noise that is not previously known or previously listed in the library, this new pattern can be added and analyzed for its root cause. A burner may be turned off if a corresponding combustion-verifying temperature sensor is incapable of registering a true flame temperature due to a coat of soot disposed over its sensing element. A blower may sound different as its bearing/s age or is/are about to cease. Although the series of attributes may still be the same, the portion of the audio input corresponding to the blower can change. With the present detection means, such an attribute can be tied to a known series of attributes. The deviation of the blower attribute within the series can then be singled out as a blower problem. It shall be noted that if this attribute had been analyzed individually, it could have signaled as a new pattern all by itself. Although this could allow failure mode detection in some circumstances, if there are multiple similar bearings used in various pieces of equipment, the failure mode could not have been pinpointed correctly as the attribute is not uniquely tied to a pattern. If the pattern is already a known pattern, then the attributes are compared to the attribute/s of the known pattern as in step 50. If a discrepancy is detected, an alert or warning is raised as in step 52 to the stakeholder of the equipment monitored by the present system. A discrepancy includes, but not limited to a significant difference in the level or magnitude of a quantity or parameter representing an attribute, a significant difference in the duration between two successive attributes and a significant difference in the order of the attributes constituting an established order of attributes, etc. It is also possible to determine the state of an equipment and make its state available for its stakeholders. Based on the audio input, it is possible to determine if an equipment is turned-off, firing, running, starting to exhibit failure symptoms or starting to fail, failing or has failed. It is further possible to detect an anomaly that is not known where further investigation will be required.

In general, there is provided a failure mode determination means adapted to detect failure modes of a device, e.g., a comfort device that includes at least one audio input device configured for receiving audio input of the comfort device. The audio input is compared to a plurality of pre-determined failure modes retrieved from a failure mode database, wherein if a match is found, the failure mode of the comfort device is determined to have been found.

More specifically, it can be summarized that a present method which includes the following practices, may be carried out to determine the failure mode of a comfort device disposed in an environment. A first audio input is obtained of the environment during a first operation of the comfort device, wherein the first operation is a known normal operation. A first non-audio input may also be combined with the first audio input to form the first input. This establishes a baseline model. The first input is classified into a class including a series of attributes and storing the first input in a database of input classes. A second audio input is obtained of the environment during a second operation of the comfort device. Again, a second non-audio input may also be combined with the second audio input to form the second input. The second input is classified into a class including a series of attributes and the class of the second input is compared to the class of the first input in a first comparison, wherein if a match exists, the series of attributes of the second input is compared to the series of attributes of the first input in a second comparison, wherein if a discrepancy is detected, a warning is raised. In one embodiment, the second comparison includes comparing an order of the series of attributes of the second input to an order of the series of attributes of the first input. In one embodiment, the second comparison includes comparing a frequency of at least one attribute of the series of attributes of the second input to a frequency of at least one corresponding attribute of the series of attributes of the first input. In one embodiment, the second comparison includes comparing the magnitude of an attribute of the series of attributes of the second input to the magnitude of an attribute of the series of attributes of the first input. In one embodiment, the second comparison includes comparing the duration between two successive attributes of the series of attributes of the second input to the duration between two successive attributes of the series of attributes of the first input. In one embodiment, each of the class corresponding to the first input and the class corresponding to the second input includes an audio input. In one embodiment, each of the class corresponding to the first input and the class corresponding to the second input includes a non-audio input.

Figure 6:
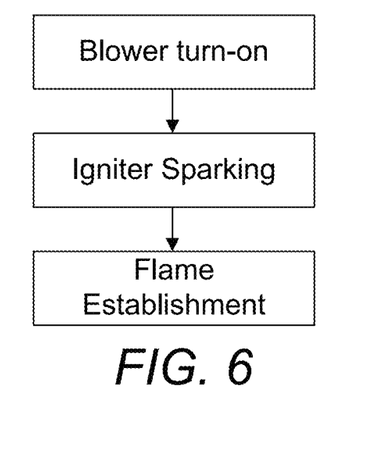
FIG. 6 shows an exemplary series of attributes for the turn-on process of a burner.
Figure 7:
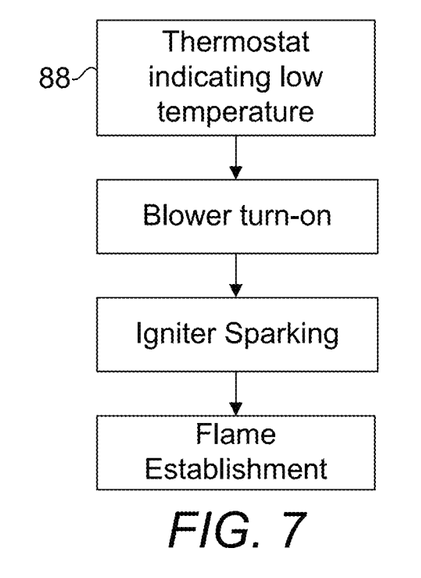
FIG. 7 shows an exemplary series of attributes for the turn-on process of a burner of a furnace.
Figure 8:
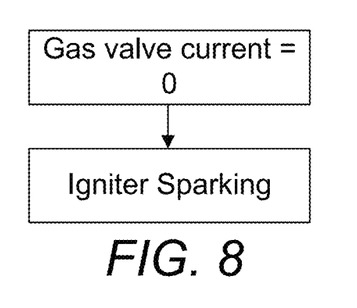
FIG. 8 shows an exemplary series of attributes for a high temperature limit failure.

In the process of determining failure modes of an equipment, one needs to first establish baseline models. FIGS. 6 and 7 each depicts a series of attributes which can be used to confirm sequence of operations of some of the components of a water heater and furnace, respectively. FIG. 6 shows an exemplary series of attributes for the turn-on process of a burner. It shall be noted that before a burner is lit, its blower will be turned on first. This is followed by one or more attempts to light the burner by creating sparks using an igniter. A fuel supply valve must also be opened at this time to supply fuel to the burner. However, the supply of fuel may not be detected by audio but a non-audio event may be combined with audio events to form a composite input. The next audio event will be the presence or formation of a flame when the burner has been lit. FIG. 7 shows an exemplary series of attributes for the turn-on process of a burner of a furnace. Again, it is possible to add other events as well that are not detectable as part of the audio input to further reinforce the audio sequence learning, e.g., by adding one or more events associated with electric current draw and flow sensor, etc. Here, it shall be noted that not all the attributes can be derived from an audio input. The series of attributes includes attributes detectable via sounds which are not unlike the series of attributes shown in FIG. 6 and an attribute not detectable via sounds or a non-audio input, i.e., the low temperature indication attribute 88 as shown in FIG. 7. Here, an event associated with an additional indication of low temperature detected in a space other than a mechanical room is coupled with events detectable via audio in the mechanical room although it is not required that the indication be disposed outside of the mechanical room. In use, if a thermostat indicates a low temperature condition and a furnace turn-on event is not detected, then the thermostat can be said to have failed and a warning is raised to the furnace's stakeholder. As all the equipment are functionally connected, and to the internet, the decision to place computation resources at one or more of the controllers should be based on the cost of computation, including the speed at which a failure mode can be determined and the speed at which a warning can be raised to the attention of a stakeholder of the equipment. It can be seen therefore that a series of attributes can be reinforced with events obtained from other sources. This applies to both the baseline model building phase as well as the failure mode detection phase. Reinforcement learning is also important in further building patterns associated with ambient sounds unrelated to the equipment sounds such that failure modes may be more readily determined. FIG. 8 shows an exemplary series of attributes for a high temperature limit failure where, again, the pattern is reinforced with an input that is not an audio input. In this example, as the gas or fuel valve fails to open as it receives no current to do so, an igniter will fail to light a burner, causing the burner to fail to produce a flue gas reaching a temperature level. Here, the valve current information could not have been obtained as an audio input.

Figure 9:
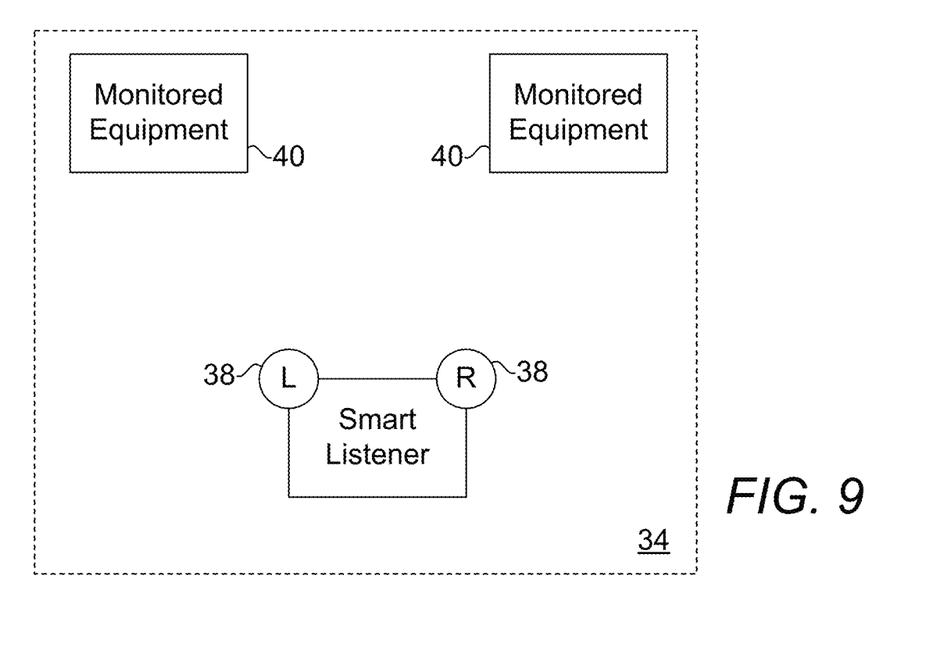
FIG. 9 is one embodiment of a listener disposed in a boiler/mechanical room where the listener is configured for pinpointing the source of an audio input.

FIG. 9 is one embodiment of a listener disposed in a boiler/mechanical room where the listener is configured for pinpointing the source of an audio input. Here, a first audio input device 38 is configured to receive a first audio input and be pointed towards a first direction relative to a comfort device 90 and a second audio input device configured to receive a second audio input and be pointed towards a second direction relative to the same comfort device 90. A failure mode determination is made according to methodologies disclosed elsewhere herein. The class of each audio input is compared to a pre-established class in a first comparison. If a match exists, the series of attributes of the audio input is compared to the series of attributes of the pre-established class in a second comparison, wherein if a discrepancy is detected, a prominence, e.g., as measured by the amplitude, of the audio input corresponding to the match is determined within each of the audio input devices 38. The audio input device 38 registering the highest prominence corresponds to the comfort device 90 from which the audio input is received. A predicted source of the audio input is determined to be the audio input device pointed at by the audio input device having the more prominent audio input of the first and second audio inputs. This practice is useful if there are multiple similar comfort devices 90 which operate at the same time as a single audio input to a single audio input device 38 would contain artifacts from multiple comfort devices 90.

Figure 10:
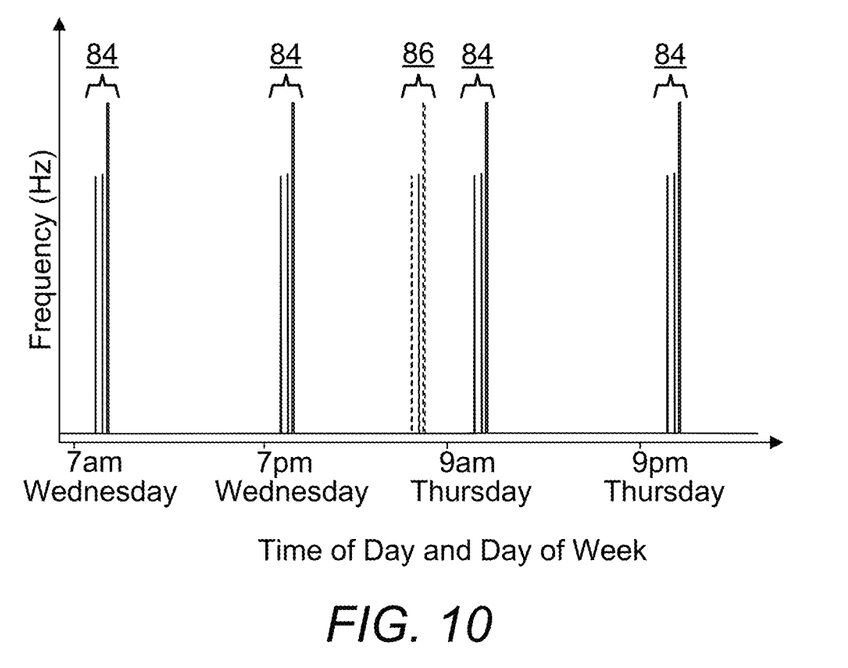
FIG. 10 is a diagram depicting series of attributes exhibited by the establishment of a flame at two different times of a day across two different days of a week.

FIG. 10 is a diagram depicting series of attributes exhibited by the establishment of a flame at two different times of a day across two different days of a week. A pattern may be identified of the series of attributes 84 that each corresponds to an event where a flame is established. For instance, if a pattern can be established where a flame is detected to be established just after 7 am and just after 7 pm every Wednesday and just after 9 am and just after 9 pm every Thursday, this pattern can be used to detect an anomaly. For instance, if an unexpected event corresponding to a series of attributes 86 occurs just prior to 9 am Thursday instead of just after 9 am Thursday, i.e., a pattern that has been established, this event can be classified as an anomaly and a stakeholder of the equipment that generates these events can be informed of this anomaly.

Although it may be possible to train every network of equipment for classifying specific failure modes from scratch, the underlying attributes of this network may be reused such that later installations are not required to be trained from the time of their installations. This is called transfer learning. For instance, new water heaters that have just been installed do not need to go through several hundred turn-on and off cycles before their various failure modes can be classified.

In one example, similar strategies as those disclosed herein may be applied to yet another device that is commonly disposed in, at least in the vicinity of or at the same floor as a mechanical room, i.e., a sump pump. The series of attributes for a sump pump turn-on event may be observed as follows: First, a sound corresponding to a pump turn-on event, or first event, is detected. This is an event where the pump speeds up from a dormant state to a point just before its steady state speed has been achieved.

Figure 11:
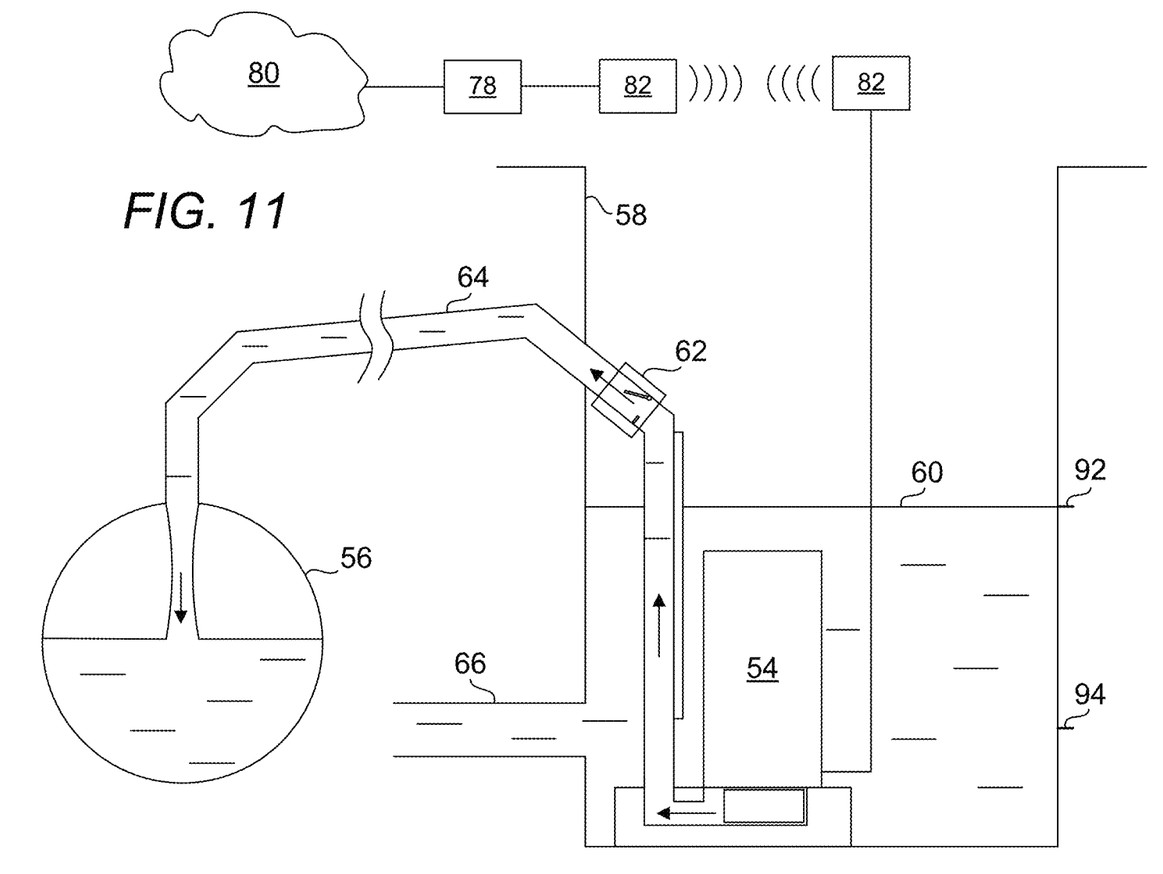
FIG. 11 is a diagram depicting a sump pump system.

This is followed by an event where a stable pump speed has been established, or a second event. Then, another event, or third event, which corresponds to the deceleration of the pump from the established speed starts to occur after a period of time has elapsed since the stable pump speed has been established. In some scenarios, the detection of the first and third events may be aided by the engagement and disengagement of a relay, respectively. FIG. 10 is a diagram depicting a sump pump system. A sump pump 54 is configured to remove water collected in the sump tank 58 from a drain system 66 via discharge pipe 64 into a storm drain 56. A check valve 62 interposed in discharge pipe 64 prevents water that has been moved into the discharge pipe 64 by the pump 54 from flowing back into the sump tank 58. The sump pump 54 is configured such that, during its operation, if water level 60 rises above a certain high level 92 as determined by one or more sensors (e.g., for indicating the water level 60), the pump 54 is turned on until the water level 60 has dropped from the high level 92 to a low water level 94 or until a pre-determined period of time has elapsed to reduce the water level 60. In the embodiment shown, the sump pump 54 is configured to be functionally connected to a controller having a transceiver 82 which communicates with a router 78, e.g., a Wi-Fi router which is connected to the internet 80.

Figure 12:
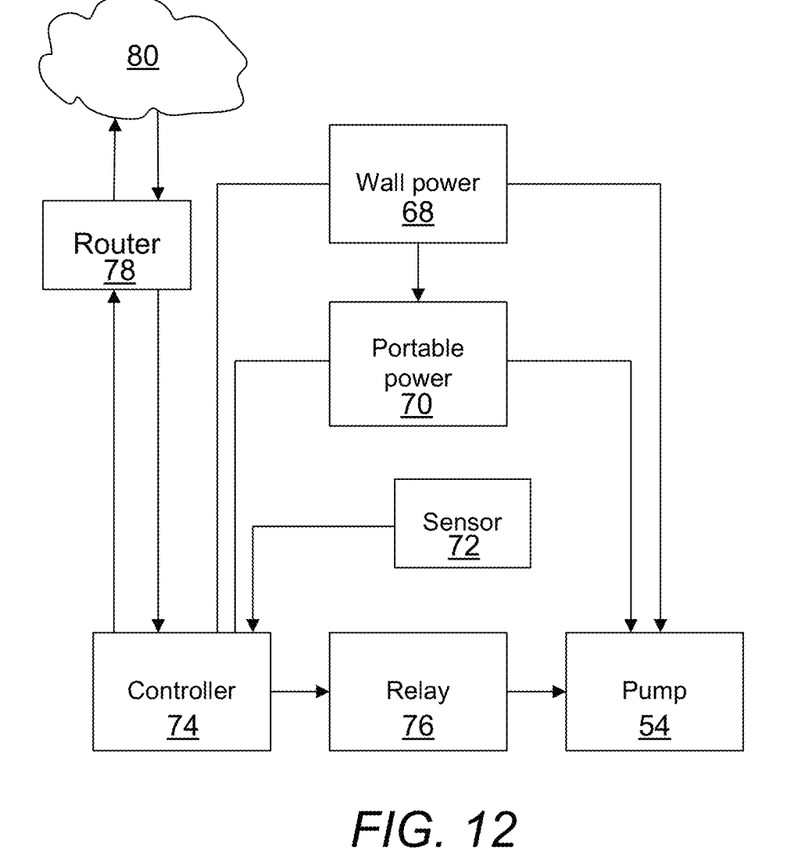
FIG. 12 is a diagram depicting a control system of the sump pump system of FIG. 11.

FIG. 12 is a diagram depicting a control system of the sump pump system of FIG. 11. Here, a controller 74 is configured to receive sensor data from a sensor 72, e.g., a water level sensor, and to output a signal capable of driving a relay 76 which controls whether a pump 54 is turned-on or turned-off depending on the state of relay 76. In one embodiment, the pump 54 is powered by a portable power source 70 whose power is replenishable by means of a wall power supply 68. In another embodiment, as long as the wall power supply 68 is available, the pump 54 is powered directly by the wall power supply 68. The portable power source 70 serves as a power source in an event where the wall power supply 68 is no longer available, e.g., during power outage to the wall power supply 68.

Figure 13:
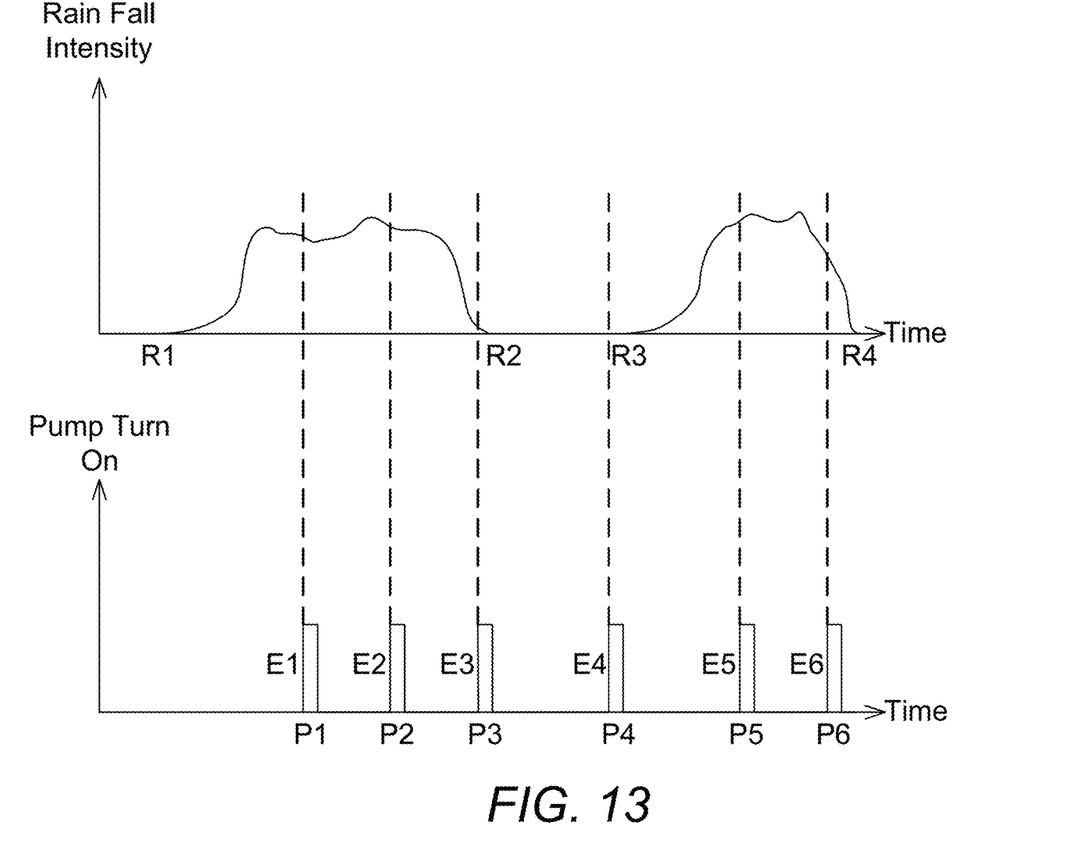
FIG. 13 is a diagram depicting first and second events showing overlaps of second events within first events and outside of first events.

A number of problems are commonly encountered in a sump pump control system. In a first problem, a sump pump can fail to turn on when the water level in a sump tank has risen to a level where the sump pump is required to be turned on. If this problem is not addressed, the water level in the sump tank can continue to rise until overflow occurs which can cause flooding. In a second problem, a sump pump can fail to turn off when the water level in a sump tank has dropped to a level where the sump pump is required to be turned off. If this problem is not addressed, the sump pump may fail due to its continued operation under low water level and the sump pump is left on unnecessarily, causing wastes in the power driving the pump and unnecessary use of the sump pump. There exists a need for a monitoring and control system capable of detecting and curtailing an undesirable action of a sump pump to prevent continued operation of the sump pump in an undesirable state and further to alert a stakeholder of a sump pump system such that a corrective action can be taken. Disclosed herein is a mechanism for detecting whether a sump pump problem is thought to have occurred and a means by which an alert can be sent to a stakeholder of a sump pump system. This mechanism is based at least partially on machine learning of weather patterns surrounding sump pump operations. More specifically, a normal response of a sump pump system with respect to rain, snow and/or temperature data can be first established upon a new installation of a sump pump system or upon an indication that subsequent sump pump operations can be trusted to be normal subsequent sump pump operations. Correlations between rain and/or snow data and the frequency and delay of turn-ons or turn-offs with respect to the severity of weather events are established. Upon a rain event, a sump tank is typically filled after rainwater from the rain event has seeped into the ground after a delay, therefore turning on the sump pump coupled to the sump tank. A snow event has the same effect although it takes the snowfall of the snow event time to melt and percolate through the ground before reaching the sump tank. The amount of water collected in the sump tank and the timing of the collection of water due to a snowfall is tied to the temperature of the air during and after the snowfall as well as snow melt is tied to the temperature of the air during and after the snowfall. Therefore, it is imperative for the present system to be able to establish a baseline sump pump system behavior before a deviation from this baseline behavior can be detected. In order to simplify the correlations between a rain event or a snow event to a sump pump operation, the concept of overlaps of events is used. An overlap is defined herein as a condition where a second event occurs as a result as a first event. Therefore, as applied herein, a second event, e.g., the turn-on of a pump can occur after a first event, e.g., a rain or a snow event as it takes time for the ground to be saturated with rainwater or snow melt water before causing the sump tank level to rise or rain or snow melt water to seep into the clear water collection system in a basement. A frequency of overlap of a second event with a first event is the number of occurrences of a second event over the duration of a first event. FIG. 13 is a diagram depicting first and second events showing overlaps of second events within first events and outside of first events. Here, rainfall intensity is plotted against time. This is correlated with the pump turn-on data. It shall be noted that during the first rainfall period lasting from R1 to R2 at the intensities depicted, the pump turns on three times at P1, P2 and P3. E1, E2 and E3 represent pump turn-on events during the R1-R2 period. During the second rainfall period lasting from R3 to R4 at the intensities depicted, the pump turns on three times at P4, P5 and P6. E4, E5 and E6 represent pump turn-on events during the R3-R4 period. Therefore, if a baseline has been established as shown in FIG. 13, the lack of a second event in a similarly classified rain event as the one shown for R1-R2 period can point to a failure to turn on the sump pump. By the same token, a second event that represents a sump pump turn-off event may also be used. Here, the lack of a sump pump turn-off event during a first event can mean a sump pump that is not turned off properly. When a fault condition is determined to have occurred, a number of actions can be taken. An alert may be sent to a stakeholder of a sump pump system or an action can be taken to address an immediate problem. For instance, if a sump pump is determined to have failed to turn off, a command for turning off the sump pump can be sent periodically to turn off the sump pump and if the sump pump is determined to have failed to turn on, a command for turning on the sump pump can be sent periodically to turn on the sump pump instead. In some scenarios, the current drawn by a sump pump can represent the water level in the sump tank in which the sump pump is disposed. A high current draw may represent a high water level in a sump tank while a low current draw may represent a low water level in the sump tank. The heath of a sump pump may be verified proactively. The sump pump may be exercised periodically, especially after a long period of time without a pump turn-on command having been sent. If a decrease in current draw is detected upon exercising or sending a command to turn on the sump pump, the sump pump is considered functional and the sump pump is left on until the drawn current falls below a threshold where the low water level in the sump tank has been achieved. An alert may also be sent a stakeholder of the sump pump system in place of or in addition to exercising the sump pump.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for controlling a drain pump in a control system having a controller operably connected to the drain pump and weather data having rain data, said method comprising using the controller for:
   (a) determining a current frequency of overlap of a second event with respect to a first event, wherein said current frequency of overlap comprises the number of occurrences of said second event within said first event and a period after said first event; and
   (b) determining the existence of a fault by comparing said current frequency of overlap to a threshold frequency of overlap, wherein if said current frequency of overlap is lower than said threshold frequency of overlap by a first gap, a pump-dead fault is raised and if said current frequency of overlap is higher than said threshold frequency of overlap by a second gap, a pump-stuck-on fault is raised.

2. The method of claim 1, wherein the drain pump is a sump pump.

3. The method of claim 1, wherein if one of said pump-dead and said pump-stuck-on faults has been raised, an action is executed.

4. The method of claim 3, wherein said action comprises sending an alert to a stakeholder of the drain pump.

5. The method of claim 1, wherein said first event comprises a time span of a day in which rain of an intensity level occurs over said time span of a day.

6. The method of claim 1, wherein said first event comprises a time span of a day in which snow of an intensity level occurs over said time span of a day.

7. The method of claim 1, wherein said second event comprises an event in which the drain pump is activated and de-activated.

* * * * *